US011182224B2

(12) United States Patent
George et al.

(10) Patent No.: US 11,182,224 B2
(45) Date of Patent: Nov. 23, 2021

(54) CLOUD MANAGEMENT OF LOW-RESOURCE DEVICES VIA AN INTERMEDIARY DEVICE

(71) Applicant: Microsoft Technology Licensing, LLC, Redmond, WA (US)

(72) Inventors: Samuel John George, Bainbridge Island, WA (US); Cameron William Skinner, Woodinville, WA (US); Chipalo Street, Seattle, WA (US); Elio Damaggio, Redmond, WA (US); Juan Perez, Redmond, WA (US); Olivier Bloch, Issaquah, WA (US); Damon Luke Barry, Redmond, WA (US); Michael R. Yagley, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/784,042

(22) Filed: Oct. 13, 2017

(65) Prior Publication Data
US 2018/0331906 A1 Nov. 15, 2018

Related U.S. Application Data

(60) Provisional application No. 62/503,787, filed on May 9, 2017.

(51) Int. Cl.
*G06F 9/54* (2006.01)
*H04L 29/08* (2006.01)
(Continued)

(52) U.S. Cl.
CPC ............... *G06F 9/542* (2013.01); *G06F 8/60* (2013.01); *G06F 8/654* (2018.02); *G06F 9/547* (2013.01);
(Continued)

(58) Field of Classification Search
USPC ......................................................... 709/223
See application file for complete search history.

(56) References Cited

U.S. PATENT DOCUMENTS 6,671,809 B1   12/2003   Perona et al.
7,275,098 B1    9/2007   Becher et al.
(Continued)

FOREIGN PATENT DOCUMENTS

WO   2014182692 A1   11/2014
WO   2019060758 A1    3/2019

OTHER PUBLICATIONS

Damaggio, Elio et al.; "Creation of Modular Applications With Corresponding Twins in the Cloud"; U.S. Appl. No. 15/639,403, filed Jun. 30, 2017; 34 pages.
(Continued)

*Primary Examiner* — Hermon Asres
(74) *Attorney, Agent, or Firm* — Davin Chin; Chin IP, PLLC

(57) ABSTRACT

The disclosed technology is generally directed to communications in an IoT environment. In one example of the technology, a virtual IoT device is maintained and controlled to act as a representation of a connected device. Communications are received from an IoT support service. The received communications from the IoT support service are acted in response to, including sending communications to the IoT support service in response to the received communications, and changing the virtual IoT device as if the virtual IoT device were the connected device. The connected device is communicated with based on changes in the virtual IoT device.

15 Claims, 7 Drawing Sheets

US 11,182,224 B2
Page 2

(51) Int. Cl.

| | | |
|---|---|---|
| H04L 12/24 | (2006.01) | |
| G06F 16/27 | (2019.01) | |
| G06F 8/654 | (2018.01) | |
| G06N 5/04 | (2006.01) | |
| H04W 12/30 | (2021.01) | |
| G06F 8/60 | (2018.01) | |
| H04L 29/06 | (2006.01) | |
| G06N 20/00 | (2019.01) | |
| H04W 4/70 | (2018.01) | |
| H04W 12/00 | (2021.01) | |
| G06N 3/02 | (2006.01) | |
| G06F 8/61 | (2018.01) | |
| G06F 9/44 | (2018.01) | |

(52) U.S. Cl.
CPC ............ *G06F 16/27* (2019.01); *G06N 5/046* (2013.01); *H04L 41/0806* (2013.01); *H04L 41/0813* (2013.01); *H04L 41/0846* (2013.01); *H04L 41/12* (2013.01); *H04L 67/1095* (2013.01); *H04L 67/12* (2013.01); *H04L 67/125* (2013.01); *H04L 67/34* (2013.01); *H04W 12/35* (2021.01); *G06F 8/61* (2013.01); *G06F 8/64* (2013.01); *G06F 9/44* (2013.01); *G06N 3/02* (2013.01); *G06N 20/00* (2019.01); *H04L 63/20* (2013.01); *H04L 67/28* (2013.01); *H04W 4/70* (2018.02); *H04W 12/009* (2019.01)

(56) References Cited

U.S. PATENT DOCUMENTS

| | | | |
|---|---|---|---|
| 9,262,152 B1 | 2/2016 | Kurian et al. | |
| 9,606,817 B1 | 3/2017 | Efstathopoulos | |
| 9,686,362 B2 | 6/2017 | Choi et al. | |
| 9,977,415 B2 | 5/2018 | Zimmerman et al. | |
| 10,171,371 B2 | 1/2019 | Anwar et al. | |
| 10,241,221 B2 | 3/2019 | Elder et al. | |
| 10,262,019 B1 | 4/2019 | Reiner et al. | |
| 10,268,524 B2 | 4/2019 | Sainaney | |
| 10,270,827 B2 | 4/2019 | Lawrence | |
| 10,404,569 B2 | 9/2019 | Hershey et al. | |
| 10,521,223 B1 | 12/2019 | Bogushefsky et al. | |
| 2007/0283002 A1 | 12/2007 | Bornhoevd et al. | |
| 2012/0233668 A1 | 9/2012 | Leafe et al. | |
| 2014/0059226 A1 | 2/2014 | Messerli et al. | |
| 2014/0241354 A1* | 8/2014 | Shuman ............... H04L 12/281 | 370/390 |
| 2015/0106616 A1 | 4/2015 | Nix | |
| 2015/0195365 A1 | 7/2015 | Choi et al. | |
| 2015/0288619 A1 | 10/2015 | Fritsch | |
| 2015/0347114 A1* | 12/2015 | Yoon ................... H04L 12/2832 | 235/375 |
| 2016/0065653 A1 | 3/2016 | Chen et al. | |
| 2016/0088049 A1 | 3/2016 | Seed et al. | |
| 2016/0124404 A1 | 5/2016 | Oh et al. | |
| 2016/0149836 A1 | 5/2016 | Narayanan et al. | |
| 2016/0197773 A1 | 7/2016 | Pandrangi et al. | |
| 2016/0247129 A1 | 8/2016 | Song et al. | |
| 2016/0248746 A1 | 8/2016 | James et al. | |
| 2016/0259627 A1 | 9/2016 | Michelsen et al. | |
| 2016/0285979 A1 | 9/2016 | Wang et al. | |
| 2016/0357525 A1 | 12/2016 | Wee et al. | |
| 2017/0005820 A1* | 1/2017 | Zimmerman .......... G05B 15/02 | |
| 2017/0006135 A1 | 1/2017 | Siebel et al. | |
| 2017/0105131 A1 | 4/2017 | Song et al. | |
| 2017/0126628 A1 | 5/2017 | Krishna | |
| 2017/0168777 A1 | 6/2017 | Britt | |
| 2017/0171607 A1* | 6/2017 | Britt ................... H04N 21/4627 | |
| 2017/0235585 A1* | 8/2017 | Gupta ..................... H04L 41/12 | 718/1 |
| 2017/0257341 A1 | 9/2017 | Arsenault et al. | |
| 2017/0287090 A1 | 10/2017 | Hunn et al. | |
| 2017/0310549 A1* | 10/2017 | Nagesh .................. H04L 43/08 | |
| 2017/0343980 A1 | 11/2017 | Uzmezler | |
| 2017/0364542 A1 | 12/2017 | Chou et al. | |
| 2018/0049179 A1 | 2/2018 | Shah | |
| 2018/0091506 A1 | 3/2018 | Chow et al. | |
| 2018/0091624 A1 | 3/2018 | Forbes | |
| 2018/0101585 A1 | 4/2018 | Curtis | |
| 2018/0102934 A1 | 4/2018 | Ly et al. | |
| 2018/0137219 A1 | 5/2018 | Goldfarb et al. | |
| 2018/0143825 A1 | 5/2018 | Noens | |
| 2018/0165131 A1 | 6/2018 | O'hare et al. | |
| 2018/0176775 A1 | 6/2018 | Obaidi | |
| 2018/0183882 A1 | 6/2018 | Flynn et al. | |
| 2018/0183889 A1 | 6/2018 | Meriac et al. | |
| 2018/0260200 A1 | 9/2018 | Karagiannis et al. | |
| 2018/0267496 A1 | 9/2018 | Wang et al. | |
| 2018/0307472 A1 | 10/2018 | Paul et al. | |
| 2018/0316655 A1 | 11/2018 | Mani et al. | |
| 2018/0341434 A1 | 11/2018 | Han | |
| 2019/0123967 A1 | 4/2019 | Dotchkoff et al. | |
| 2019/0132236 A1 | 5/2019 | Rahman et al. | |
| 2019/0132280 A1 | 5/2019 | Meuninck et al. | |
| 2019/0182333 A1 | 6/2019 | Bartfai-Walcott et al. | |
| 2019/0250912 A1 | 8/2019 | Gavisiddappa Kodigenahalli et al. | |
| 2019/0306242 A1* | 10/2019 | Thummalapalli ..... H04L 67/141 | |
| 2019/0372826 A1 | 12/2019 | Sherr | |
| 2020/0065123 A1 | 2/2020 | Yang et al. | |
| 2020/0344299 A1 | 10/2020 | Sohail et al. | |
| 2020/0394087 A1 | 12/2020 | Damaggio et al. | |

OTHER PUBLICATIONS

Damaggio, Elio et al.; "Modular Applications Using a Common Provisioning Service"; U.S. Appl. No. 15/639,375, filed Jun. 30, 2017; 43 pages.

George, Samuel John et al.; "Cloud Modification of Modular Applications Running on Local Devices"; U.S. Appl. No. 15/784,045, filed Oct. 13, 2017; 34 pages.

George, Samuel John et al.; "Distribution of Events in Edge Devices"; U.S. Appl. No. 15/784,046, filed Oct. 13, 2017; 44 pages.

George, Samuel John et al.; "Hierarchical Split of Application Between Cloud and Edge"; U.S. Appl. No. 15/784,048, filed Oct. 13, 2017; 41 pages.

Street, Chipalo et al.; "Deployment of Modular Applications From the Cloud to Local Devices"; U.S. Appl. No. 15/639,419, filed Jun. 30, 2017; 34 pages.

"Non Final Office Action Issued in U.S. Appl. No. 15/639,419", dated Sep. 27, 2018, 26 Pages.

Kazi, et al., "C2PS: A Digital Twin Architecture Reference Model for the Cloud-Based Cyber-Physical Systems", In the Proceedings of IEEE on Access, vol. 5, Jan. 23, 2017, 13 Pages.

"Understand device twins—preview", Retrieved from: https://github.com/blumu/azure-content/blob/master/articles/iot-hub/iot-hub-devguide-device-twins.md, Oct. 1, 2016, 6 Pages.

Gutierrez, Peter, "Why IoT devices need a 'digital twin'", Retrieved from: https://www.iothub.com.au/news/why-iot-devices-need-a-digital-twin-431339, Jul. 25, 2016, 7 Pages.

Shi, et al., "Edge Computing: Vision and Challenges", In Journal of IEEE Internet of Things, vol. 3, No. 5, Oct. 1, 2016, pp. 637-646.

"International Search Report and Written Opinion Issued in PCT Application No. PCT/US18/026988", dated Jun. 21, 2018, 13 Pages.

"International Search Report and Written Opinion Issued in PCT Application No. PCT/US18/026989", dated Jun. 21, 2018, 13 Pages.

"International Search Report and Written Opinion Issued in PCT Application No. PCT/US18/026990", dated Jun. 21, 2018, 13 Pages.

"International Search Report and Written Opinion Issued in PCT Application No. PCT/US18/026991", dated Jun. 21, 2018, 13 Pages.

Tang, Bo, et al., "A Hierarchical Distributed Fog Computing Architecture for Big Data Analysis in Smart Cities", In Proceedings with ASE BIG Data and Social Informatics, Oct. 7, 2015, 6 Pages.

(56) References Cited

OTHER PUBLICATIONS

"Non Final Office Action Issued in U.S. Appl. No. 15/639,375", dated Mar. 8, 2019, 24 Pages.
"Notice of Allowance Issued in U.S. Appl. No. 15/639,403", dated Apr. 11, 2019, 10 Pages.
"Final Office Action Issued in U.S. Appl. No. 15/639,419", dated Mar. 28, 2019, 27 Pages.
"Non Final Office Action Issued in U.S. Appl. No. 15/784,048", dated Aug. 9, 2019, 20 Pages.
"Final Office Action Issued in U.S. Appl. No. 15/639,375", dated Sep. 5, 2019, 26 Pages.
"Non Final Office Action Issued in U.S. Appl. No. 15/784,045", dated May 28, 2019, 11 Pages.
"Non Final Office Action Issued in U.S. Appl. No. 15/639,419", dated Sep. 19, 2019, 18 Pages.
"Notice of Allowance Issued in U.S. Appl. No. 15/784,045", dated Oct. 11, 2019, 7 Pages.
"Non Final Office Action Issued in U.S. Appl. No. 15/784,046", dated Sep. 23, 2019, 23 Pages.
"Non Final Office Action Issued in U.S. Appl. No. 15/639,403", dated Oct. 7, 2019, 9 Pages.
"Non Final Office Action Issued in U.S. Appl. No. 15/639,375", dated Jan. 22, 2020, 29 Pages.
"Final Office Action Issued in U.S. Appl. No. 15/784,048", dated Feb. 6, 2020, 20 Pages.
"Final Office Action Issued in U.S. Appl. No. 15/639,419", dated Mar. 10, 2020, 24 Pages.
"Final Office Action Issued in U.S. Appl. No. 15/784,046", dated Mar. 6, 2020, 24 Pages.
Yin, et al., "Edge Network Model Based on Double Dimension", In Proceedings of IEEE 8th Annual Computing and Communication Workshop and Conference, Jan. 8, 2018, pp. 341-346.
"Non Final Office Action Issued in U.S. Appl. No. 15/784,048", dated Aug. 25, 2020, 22 Pages.
"Notice of Allowance Issued in U.S. Appl. No. 15/639,403", dated Jul. 1, 2020, 7 Pages.
"Notice of Allowance Issued in U.S. Appl. No. 15/639,375", dated May 14, 2020, 10 Pages.
"Final Office Action Issued in U.S. Appl. No. 15/639,403", dated Mar. 26, 2020, 10 Pages.
"Non Final Office Action Issued in U.S. Appl. No. 15/639,419", dated Nov. 4, 2020, 13 Pages.
"Final Office Action Issued in U.S. Appl. No. 15/784,046", dated Feb. 8, 2021, 25 Pages.
"Office Action Issued in European Patent Application No. 18720927.5", dated Dec. 14, 2020, 6 Pages.
"Office Action Issued in European Patent Application No. 18721568.6", dated Dec. 15, 2020, 7 Pages.
"Final Office Action Issued in U.S. Appl. No. 15/784,048", dated Dec. 22, 2020, 25 Pages.
"Office Action Issued in European Patent Application No. 18722290.6", dated Nov. 30, 2020, 6 Pages.
"Non Final Office Action Issued in U.S. Appl. No. 15/784,046", dated Sep. 25, 2020, 23 Pages.
"Ex Parte Quayle Action Issued in U.S. Appl. No. 15/639,419", dated Apr. 27, 2021, 10 Pages.
Bakshi, Kapil, "Big Data Analytics Approach for Network Core and Edge Applications", In Proceedings of the IEEE Aerospace Conference, Mar. 5, 2016, 10 Pages.
Canedo, Arquimedes, "Industrial IoT Lifecycle via Digital Twins", In Proceedings of the Eleventh IEEE/ACM/IFIP International Conference on Hardware/Software Codesign and System Synthesis, Oct. 1, 2016, 1 Page.
Holder, et al., "Cloud Twin: Native Execution of Android Applications on the Windows Phone", In Proceedings of the 28th IEEE/ACM International Conference on Automated Software Engineering, Nov. 11, 2013, pp. 598-603.
"Non Final Office Action Issued in U.S. Appl. No. 17/004,012", dated Jun. 11, 2021, 35 Pages.
"Non Final Office Action Issued in U.S. Appl. No. 15/784,048", dated Aug. 17, 2021, 28 Pages.
"Notice of Allowance Issued in U.S. Appl. No. 15/639,419", dated Sep. 1, 2021, 14 Pages.
Sharma, et al., "Live Data Analytics with Collaborative Edge and Cloud Processing in Wireless Iot Networks", In Journal of IEEE Access, vol. 5, Mar. 20, 2017, pp. 4621-4635.
Zhang, et al., "Lightweight SOA-Based Twin-Engine Architecture for Enterprise Systems in Fixed and Mobile Environments", In Journal of China Communications, vol. 13, vol. 9, Sep. 2016, pp. 183-194.
"Final Office Action Issued in U.S. Appl. No. 17/004,012", dated Sep. 30, 2021, 38 Pages.

* cited by examiner

CLOUD MANAGEMENT OF LOW-RESOURCE DEVICES VIA AN INTERMEDIARY DEVICE

CROSS-REFERENCE TO RELATED APPLICATION(S)

This application claims the benefit of U.S. Provisional Application No. 62/503,787, filed May 9, 2017. The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include sensors in buildings and factory machines, sensors and actuators in remote industrial systems, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to IoT technology. In one example of the technology, a virtual IoT device is maintained and controlled to act as a representation of a connected device. In some examples, communications are received from an IoT support service. In some examples, the received communications from the IoT support service are acted in response to, including sending communications to the IoT support service in response to the received communications, and changing the virtual IoT device as if the virtual IoT device were the connected device. In some examples, the connected device is communicated with based on changes in the virtual IoT device.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
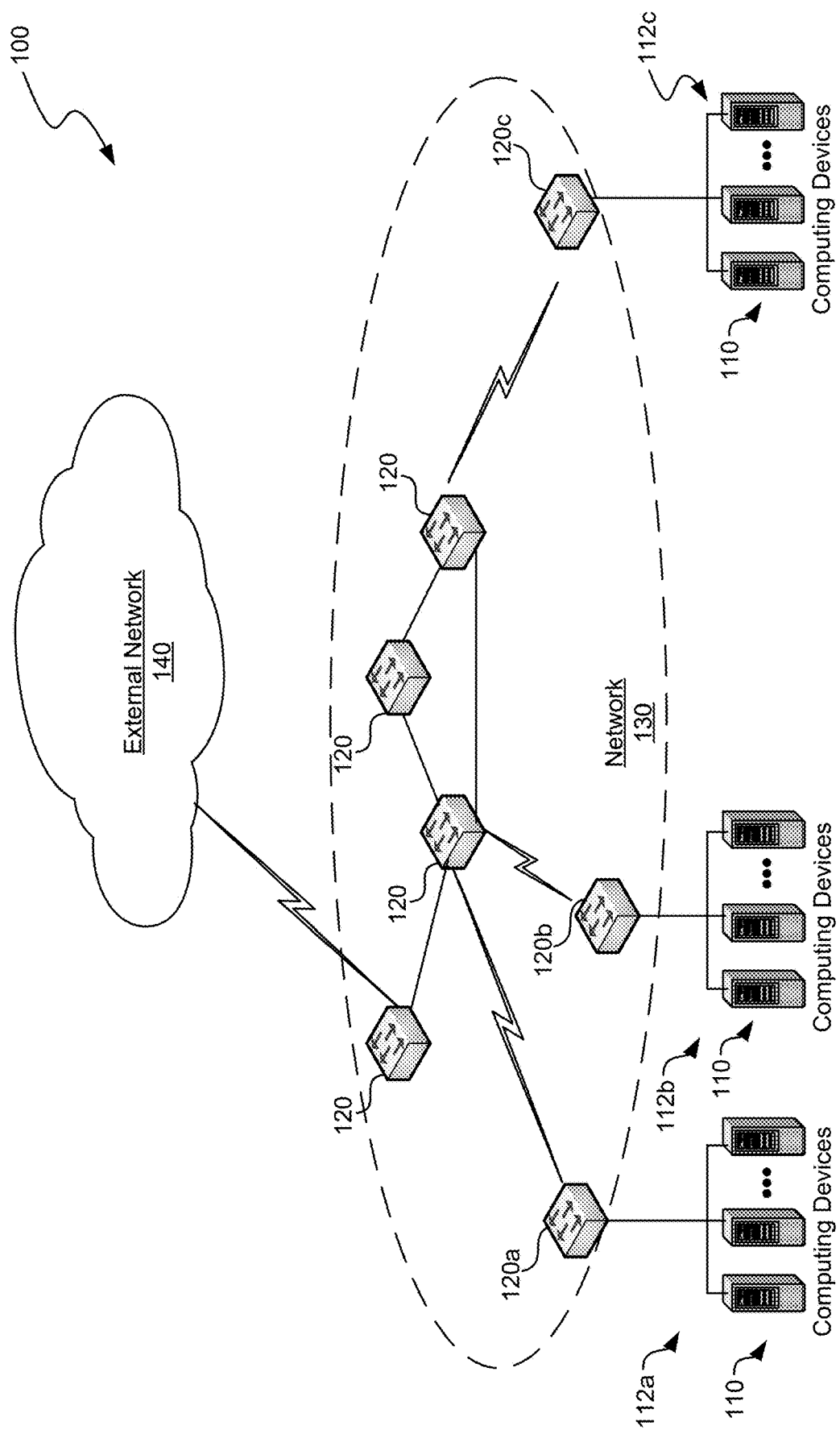
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to IoT technology. In one example of the technology, a virtual IoT device is maintained and controlled to act as a representation of a connected device. In some examples, communications are received from an IoT support service. In some examples, the received communications from the IoT support service are acted in response to, including sending communications to the IoT support service in response to the received communications, and changing the virtual IoT device as if the virtual IoT device were the connected device. In some examples, the connected device is communicated with based on changes in the virtual IoT device.

IoT devices may communicate with an IoT support service to receive IoT services, either communicating directly with the IoT support service or indirectly via one or more intermediary devices such as gateway devices. Edge devices may include IoT devices and/or gateway devices.

Some of the intermediary devices may include virtual IoT devices that represent corresponding connected devices. An intermediary device maintaining a virtual IoT device may control the virtual IoT device such that for devices other than the corresponding device, the virtual IoT device appears to be the connected device. The virtual IoT device may have capabilities that the connected device lacks. For example, the connected device may be not even be an IoT device, or may be an IoT device with low resources or relatively low capabilities, or may not be configurable or may not be capable of storing and executing new code, or may not have sufficient resources for the amount or complexity of new code that would otherwise be installed on the device.

Accordingly, in some examples, the virtual IoT device acts as if it were the connected device in all respects, and may have resources and capabilities that the actual connected device lacks. In some examples, the intermediary device communicates with the corresponding connected devices to perform functions for the connected device to perform. For instance, in some examples in which the connected device is a coffee machine, and the virtual IoT device received commands to begin brewing coffee, the virtual IoT device acts as if it were the coffee machine, but the virtual IoT device itself does not brew coffee. Accordingly, in these examples, the intermediary device sends commands to the coffee machine to begin brewing coffee, and receives communication back from the connected device such as the status of brewing the coffee, whether the machine is brewing coffee or whether there is an error, or the like. The virtual IoT device can then be updated based on the received information from the connected device, such as the status of brewing or whether or not an error has occurred, and based on the updated of the virtual IoT device, the intermediary device may communicate back to the IoT support service as if the virtual IoT device is the connected device.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices no is an IoT device, a device that comprises part or all of an IoT hub, a device comprising part or all of an application back-end, or the like, as discussed in greater detail below.

Illustrative Computing Device

Figure 2:
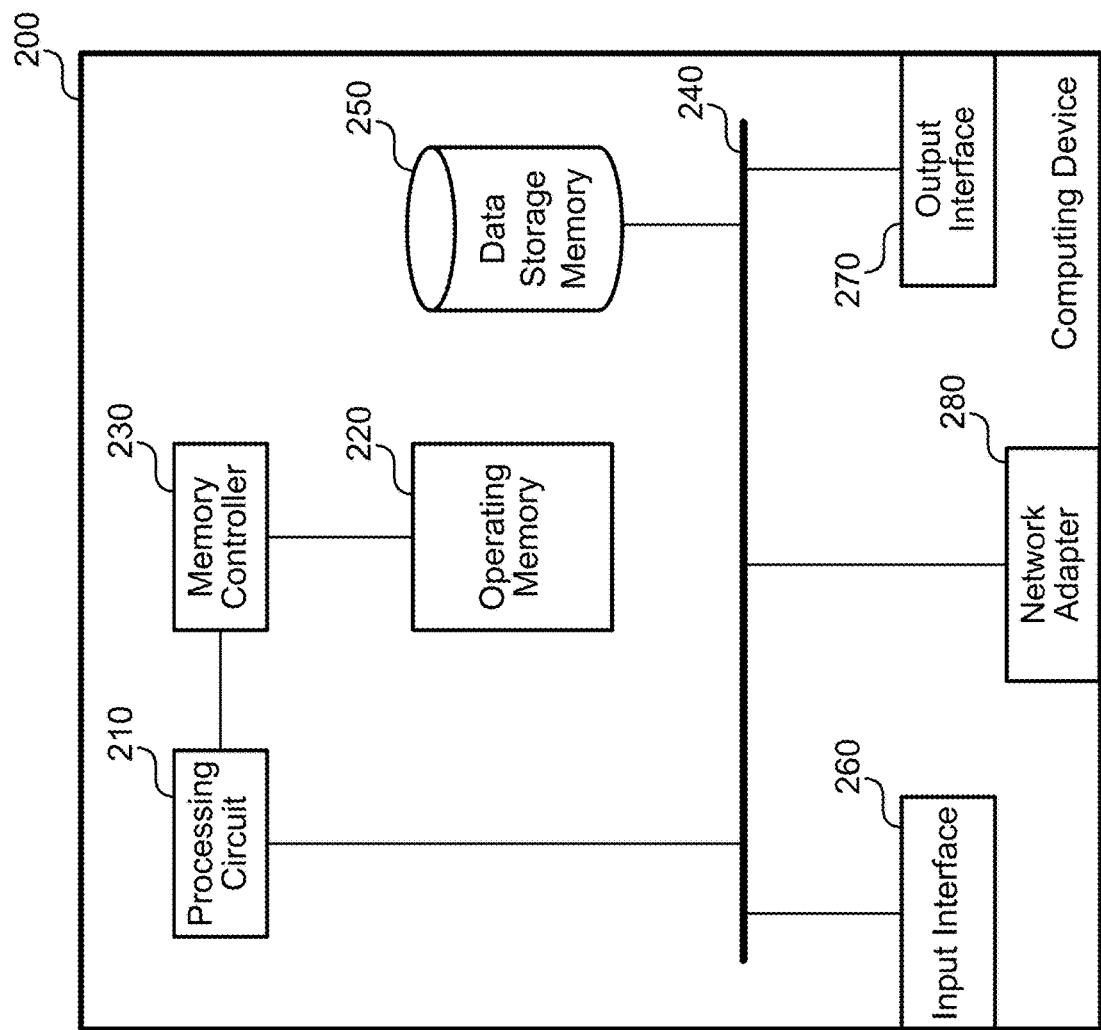
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage memory 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudostatic random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
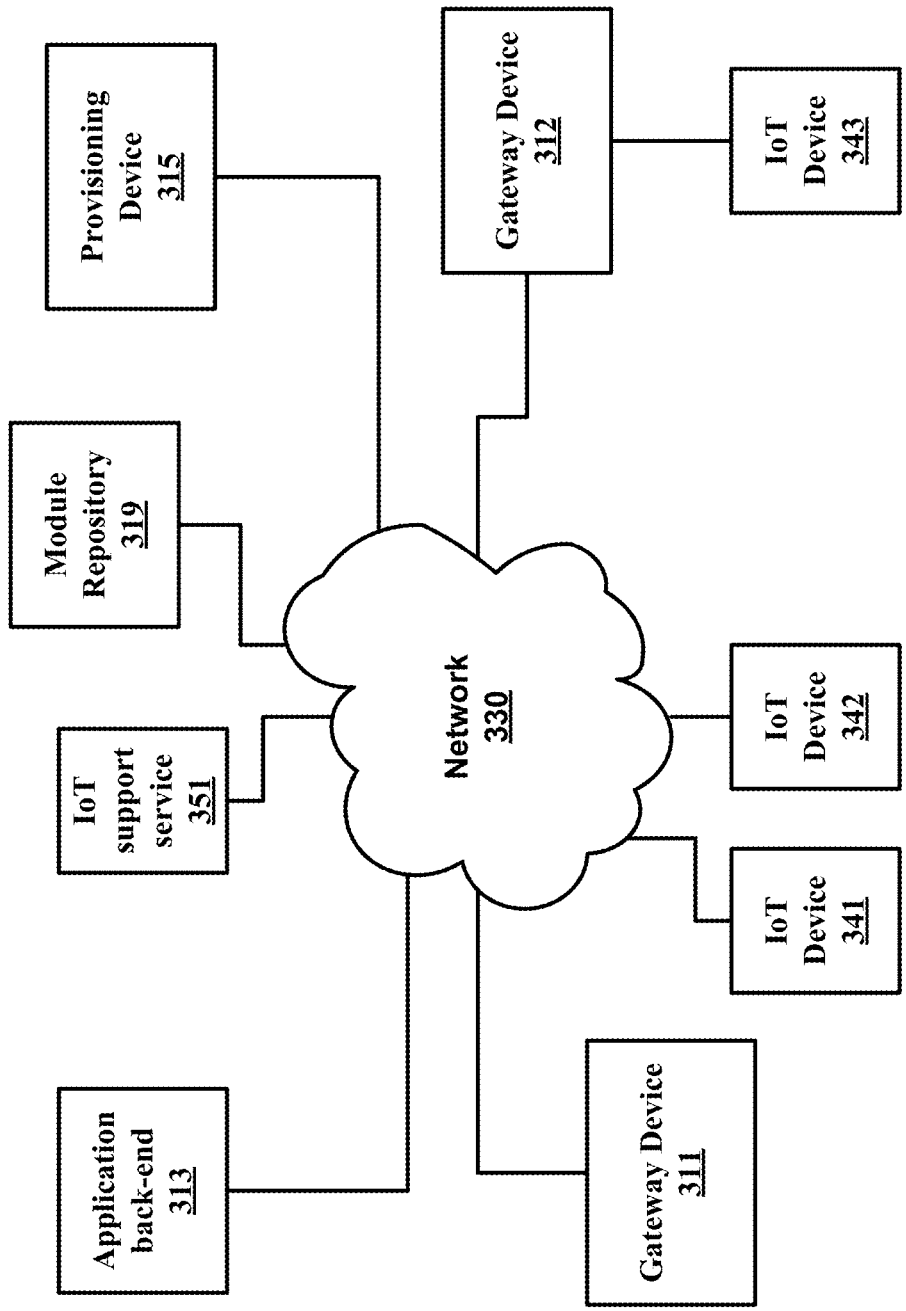
FIG. 3 is a block diagram illustrating an example of a system.

FIG. 3 is a block diagram illustrating an example of a system (300). System 300 may include network 330, as well as IoT support service 351, IoT devices 341-343, gateway devices 311 and 312, provisioning service device 315, and application back-end 313, and module repository 319, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, and/or personalization of settings. However, the foregoing list merely includes some of the many possible users for IoT services. Such services may be employed for, or in conjunction with, numerous other applications, whether or not such applications are discussed herein. In some examples, IoT devices 341-343 and gateway devices 311 and 312 are edge devices, e.g., a connected device other than an IoT support service device or cloud back-end device, whereas IoT support service 351 is a cloud service and/or device.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. For example, application back-end 313 may include a device or multiple devices that perform back-end functions in support of IoT services. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

In some examples, gateway devices 311 and 312 are each a device, or multiple devices such as a distributed system. In some examples, gateway devices may be edge devices that serve as network intermediaries between one or more IoT devices and an IoT support service.

In some examples, provisioning service device 315 refers to a device, or multiple devices such as a distributed system, that perform actions in provisioning an edge device to an IoT support service.

In some examples, module repository 319 refers to a device, or multiple devices such as a distributed system, that store modules for deployment in edge devices (e.g., IoT devices 341-343 and/or gateway devices 311 and 312). In some examples, module repository 319 is not used, and modules for deployment in the edge devices may instead be stored in IoT support service 351 or application back-end 313.

Each of the IoT devices 341-343, and/or the devices that comprise IoT support service 351 and/or application back-end 313 and/or gateway devices 311 and 312 and/or provision service device 315 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341-343, and/or application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by the IoT support service, which, in some examples, includes one or more IoT support services, such as IoT support service 351. IoT devices 341-343 may be coupled to IoT support service 351, directly, via network 330, via a gateway device (e.g., gateway device 312), via multiple gateway devices, and/or the like.

System 300 may include more or less devices than illustrated in FIG. 3, which is shown by way of example only.

Figure 4:
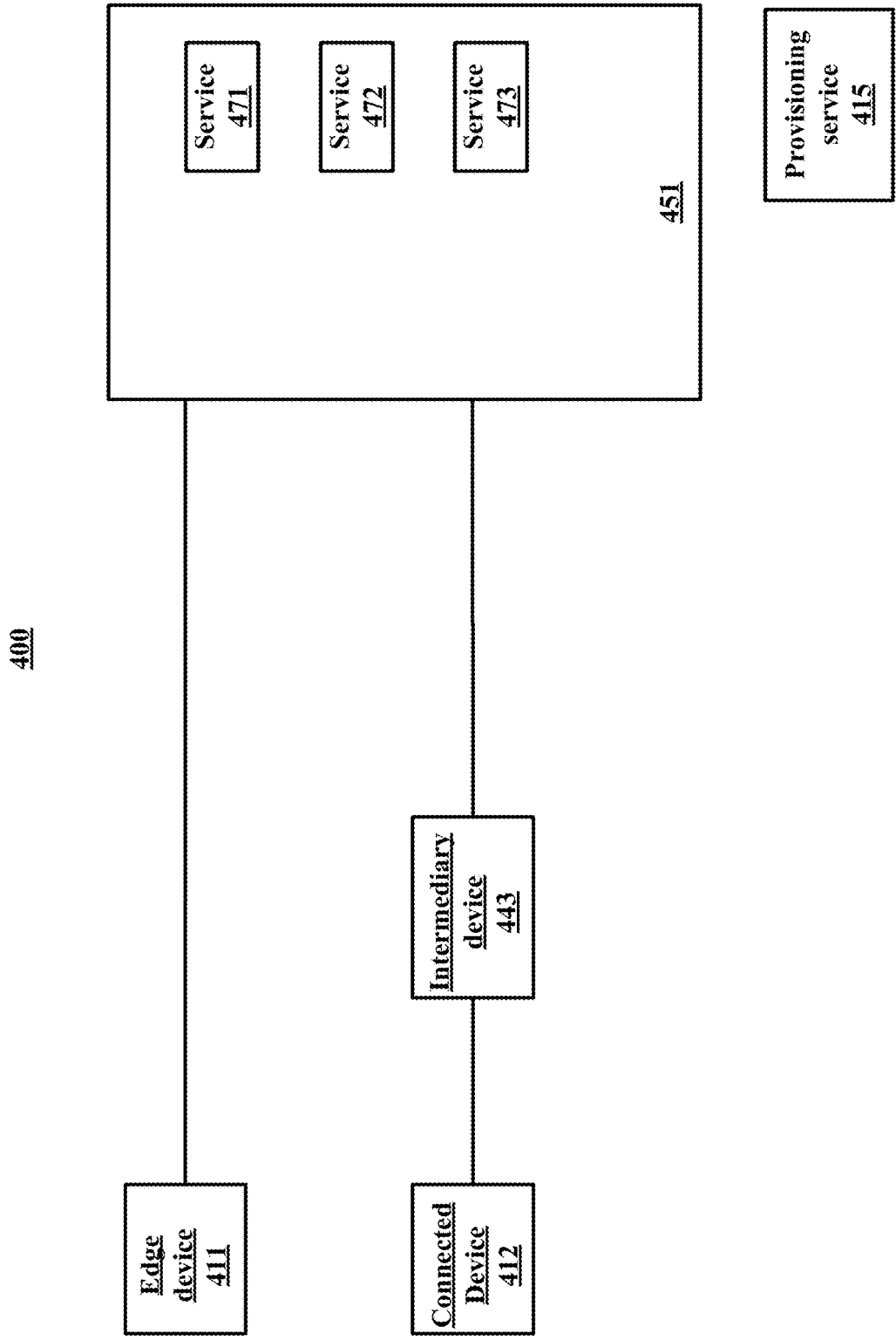
FIG. 4 is a block diagram illustrating an example of a system that may be used as a subset of the system of FIG. 3.

FIG. 4 is a diagram illustrating an example of a system 400. In some examples, system 400 may be employed as a subset of system 300 of FIG. 3. FIG. 4 and the corresponding description of FIG. 4 in the specification illustrate an example system for illustrative purposes that does not limit the scope of the disclosure.

In some examples, system 400 includes edge device 411, provisioning service 415, IoT support service 451, intermediary device 443, and connected device 412. Edge device 511 may be an IoT device and/or a gateway device. IoT support service 451 may include services 471-473.

Provisioning service 415 may be used to provision edge devices with IoT support service 451.

Services 471-473 may perform various functions in IoT support service 451. Services 471-473 may include, for example, analytics services, portable translation services, logic services, telemetry components service, module management services, filtering services, batching services, compression services, machine learning services, artificial intelligence (AI) services, and/or the like.

In some examples, intermediary device 443 is an edge device that maintains and controls, in software running on intermediary device 443, a virtual IoT device that represents corresponding connected device 412. Intermediary device 443 may control the virtual IoT device such that for devices other than connected device 412, the virtual IoT device appears to be connected device 412. The virtual IoT device running on intermediary device 442 may have capabilities that connected device 412 lacks. For instance, in some examples, connected device 412 may be not even be an IoT device, or may be an IoT device with low resources or relatively low capabilities, or may not be configurable or may not be capable of storing and executing new code, or may not have sufficient resources for the amount or complexity of new code that would otherwise be installed on the device.

Accordingly, in some examples, the virtual IoT device executing on intermediary device 443 acts as if it were connected device 412 in all respects, and may have resources and capabilities that connected device 412 lacks. The virtual IoT device may use the same software development kit (SDK) used by other high-resource IoT devices. In some examples, intermediary device 443 communicates with connected device 412 to perform functions for connected device 412 to perform.

For instance, in some examples in which connected device 412 is a coffee machine, and the virtual IoT device executing on intermediary device 443 receives commands to begin brewing coffee, the virtual IoT device executing on intermediary device 443 acts as if it were the coffee machine (connected device 412), but the virtual IoT device itself does not brew coffee. Accordingly, in these examples, intermediary device 443 sends commands to the coffee machine to begin brewing coffee, and receives communication back from connected device 412 such as the status of brewing the coffee, whether the machine is brewing coffee or whether there is an error, or the like. The virtual IoT device can then be updated based on the received information from connected device 412, such as the status of brewing or whether or not an error has occurred, and based on the updated status of the virtual IoT device, intermediary device 443 may communicate back to IoT support service 451 as if the virtual IoT device is connected device 412.

As another example, in examples in which connected device 412 is a light bulb or a lock capable of communicating via a network protocol, the virtual IoT device can act as if it is the light bulb or lock as a configurable, high-resource IoT device. In these examples, when the virtual IoT device receives a command to change the status of the device—such as turning the light bulb on or off, or locking or unlocking the lock, the virtual IoT device acts if it were the connected device, while controlling the device itself to change status (e.g., turn the light on and off or lock or unlock the lock), via the network protocol, and can act in an appropriate manner if there is an error or the like.

In some examples, connected device 412 may be a low-resource device that is capable of communicating over a network via the Modbus protocol, which is a serial, bi-directional, master/slave communications protocol. In these example, the virtual IoT device executing on intermediary device 443 acts as if it were connected device 412, and intermediary device 443 communicates with connected device 412 via Modbus. In some examples, no devices other than intermediary device 443 and connected device 412 need use the Modbus protocol or even be aware that connected device 412 is actually a Modbus device; from the perspective of all other devices, the virtual IoT device executing on intermediary device 443 is the actual connected device, and the connected device is a high-resource IoT device, even though in reality connected device 412 is a low-resource device that can only communicate over a network using the Modbus protocol. Other suitable protocols other than Modbus may be employed, which is discussed by way of example only.

A single intermediary device, such as intermediary device 443, may maintain and control more than one virtual IoT device on the intermediary device. In some examples, each virtual IoT device on the intermediary device is isolated from each other virtual IoT device, and each virtual IoT device on the intermediary device has its own security context. Whether or not multiple virtual IoT devices are maintained on a single intermediary device, each virtual IoT device appears to be the actual connected device to other devices.

In some examples, IoT support service 451 may manage intermediary devices such as intermediary device 443 for connected devices such as connected device 412. For example, when a connected device such as connected device 412 is first provisioned, IoT support service 451 may configure an edge device to operate as intermediary device 443, and may cause intermediary device 443 to be configured to act as intermediary device 443 and to execute a virtual IoT device corresponding to connected device 412. Connected device 412 may already have the necessary software for maintaining and controlling virtual IoT devices and may already be maintaining and controlling one or more virtual IoT devices, and IoT support service 451 may configure intermediary device 443 to also maintain and control another virtual IoT device, this one corresponding to connected device 412. Or, instead, intermediary device 443 may not have software suitable for maintaining and controlling a virtual IoT device, and IoT support service 451 may cause intermediary device 443 to have installed on intermediary device 443 software suitable for maintaining and controlling a virtual IoT device, and then cause intermediary device 443 to maintain and control a virtual IoT device corresponding to connected device 412.

Figure 5:
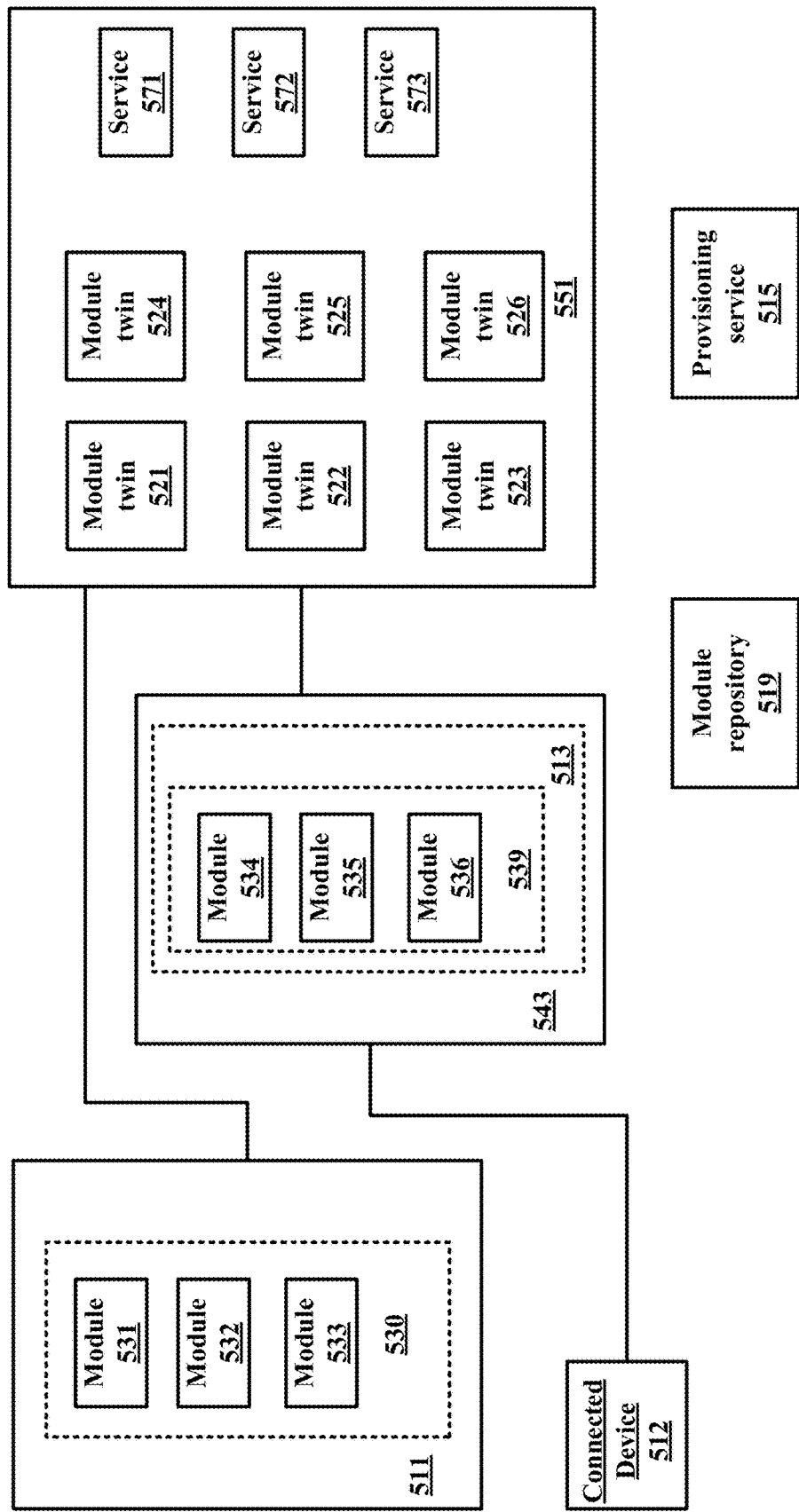
FIG. 5 is a block diagram illustrating an example of the system of FIG. 3 in which the virtual IoT device includes modules.

FIG. 5 is a diagram illustrating an example of a system 500. In some examples, system 500 may be employed as an example of system 400 of FIG. 4. FIG. 5 and the corresponding description of FIG. 5 in the specification illustrate an example system for illustrative purposes that do not limit the scope of the disclosure.

In some examples, system 500 includes edge device 511, provisioning service 515, IoT support service 551, intermediary device 543, connected device 512, and module repository 519. Edge device 511 may include application 530, and application 530 may include modules 531-533. Edge device 511 may be an IoT device and/or a gateway device. Intermediary device 543 includes virtual IoT device 513, which corresponds to connected device 512. Virtual IoT device 513 includes application 539, which may include modules 534-536. IoT support service 551 may include services 571-573 and module twins 521-526. Although not shown in FIG. 5, in some examples, edge device 511 may communicate with IoT support service 551 through one or more intermediary devices, such as gateway devices, or may instead connected to IoT support service 551 without using any gateway devices.

As discussed above, in some examples, intermediary device 543 is an edge device maintains and controls, in software running on intermediary device 543, virtual IoT device 513, which represents corresponding connected device 512. Intermediary device 543 may control virtual IoT device 513 such that for devices other than connected device 512, virtual IoT device appears 513 to be connected device 512, and modules 534-536 appear to be running on connected device 512.

In some examples, modules 531-536 are re-usable, e.g., they do not depend on being in a specific environment. Instead, the modules can be used with other combinations of modules, e.g., to form a different application. In some examples, each module has the "illusion" that it is the only module present, but can communicate with other modules, and with the IoT support service or other endpoint. In some examples, each module can act in isolation from each other module. In some examples, communications between each module in an application, and with the IoT support service, are all conducted according to a common security context. In some examples, the common security context defines a provisioning service to be used by the modules.

In some examples, modules twins 521-526 are serve as a "cloud representation" of a corresponding module, e.g., modules 531-536. In some examples, each module twin is a set of securely isolated primitives comprising communication and state synchronization primitives. In some examples, each module twin includes metadata about the corresponding module, such as what type of module it is, various information about the module, as well as relevant information about the device that the module is in (e.g., type of device, capabilities, location, and/or the like, where relevant to the module). In some examples, at least a portion of each module twin is synchronized with the corresponding module. In some examples, the module twins are queryable, and can be used in the answering of queries about the corresponding module. For instance, a query could be made to determine which smart locks in a room are locked, which smart lights in the room are on, or what the temperature is in the room, and the relevant module could respond with the appropriate information.

Each module twin may have its own separate telemetry channel to its corresponding module. When modules are added or removed from devices, IoT support service 551 may be updated accordingly by adding or removing the corresponding module twins, for example, automatically. Although FIG. 5 shows only two edge devices and the corresponding module twins for the modules on the edge devices, there may be numerous edge devices, and IoT support service 551 may store a corresponding module twin for each module of each edge device that has been provisioned with IoT support service 551.

Examples of modules may include logging modules, telemetry modules, analytics modules, AI configuration modules, management modules, filtering modules, batching modules, compression modules, sensor reader modules, module communications modules, function modules, and/or the like. In some examples, each of the modules and each of the services and other elements of the infrastructure all support a "first-class" notion of modules. A "first-class" notion of modules means that the modules and services recognize what a module is directly without requiring translation when a module is referenced. In some examples, the use of modules as a first-class notion makes inter-module communication and service-to-module communication relatively simple, because communication to a module can refer directly to the module being communicated to. In some examples, with a first-class notion of modules, modules can be packaged, referred to, and authenticated, and messages can be sent to and from the modules.

In some examples, each of the modules is independent. The modules can be composed and distributed among devices in various arrangements without requiring modification to the internal code of modules or of the supporting services, including among heterogeneous devices. For example, modules can be added and/or removed from an edge application without requiring modifications to the code of any of the modules. Modules can be used in different configurations in different edge applications, e.g., so that one module can be reused among many different edge applications by composing applications from different combinations of modules. In some examples, each module has, in effect, the "illusion" that it is a complete application, and does not have to take into account what else is happening on the device. Each module can act in isolation from other modules on the same device. Declarative communication can be defined to and from individual modules, for example between two modules and/or between a module and a cloud service. In some examples, the modules are reusable across application or other solutions. Modules that compose an edge application may also be built by different parties.

In some examples, an edge application may be composed of modules and an edge runtime functionality. In some examples, the edge runtime functionality may itself also be a module. In some examples, the runtime functionality may perform module management functions such as configuration modules, performing per-module logs and metrics, communication routing between modules and between modules on the cloud, managing offline capabilities of the edge device, assist in the deployment of modules at the direction of the IoT support service, and/or the like.

As discussed above, in some examples, each module in an application shares the same security context. In some examples, this may include connecting in a secure way to the same endpoint, establishing a secure connection with the same secure host with mutual/bi-directional authentication, and/or the like. In some examples, the shared security context also includes provisioning with the same provisioning service or process. In some examples, there are multiple channels and multiple sessions due to the multiple modules, and each of the multiple channels is individually authenticated. However, in some examples, the multiple channels share the same secure connection.

In some examples, provisioning of an edge device may be accomplished as follows. Edge device 511 may have an endpoint uniform resource indicator (URI) that is installed in the factory. In some examples, on first power-up and first boot-up, edge device 511 is cryptographically guaranteed to connect to provisioning service 515 and not elsewhere. Also, edge device 511 may store identity information about itself as well as optional metadata, e.g., geolocation metadata. Further, provisioning service 515 may have some method to verify the identity of edge device 511.

The source used to verify the identity of IoT device 511 may provide provisioning service 515 with additional metadata. Provisioning service 515 may also contain rules and/or a rule engine used to route an edge device's provisioning request to the correct IoT support solution. For example, one rule may include a definition that all edge devices within a certain geographic region are to be provisioned to an IoT solution located in a certain region. Provisioning service 515 may be configured with information regarding how to connect a device to one or more separate IoT support solutions.

After provisioning service 515 selects an IoT support service 551 for edge device 511, provisioning service 511 may send a request to register to IoT support service 551. The request to may include connection information associated with gateway device 511. IoT support service 551 may then register each module in edge device 511 in a registry in IoT support service 551. In some examples as part of the registration, IoT support service 551 creates a separate identifier for each module in edge device 511. These identifiers may be used by components of IoT support service 551 to map secure communication channels between the IoT support service and the corresponding modules.

In some examples, next, cryptographic information about edge device 511 is communicated from IoT support service 551 to provisioning service 515, and in turn the cryptographic information about edge device 511 is communicated from provisioning service 515 to edge device 511. As part of this communication, IoT support service 551 may queue commands for edge device 511, or queue commands to be sent for edge device 511 to subsequently complete. In one example, this completes the provisioning process. The cryptographic information may also include credentials, the hostname of the selected IoT support service 551, connectivity information for edge device 511 to connect with IoT support service 551, and/or the like. In other examples, the provisioning process completes in some other manner.

After provisioning is complete, in some examples, communications between edge device 511 and IoT support service 551 may occur directly and/or in a "normal" fashion (or through gateway devices, but not through provisioning service 515). In some examples, provisioning service 515 is not again involved in communications between edge device 511 and IoT support service 551, unless, for example, edge device 511 is to be re-provisioned.

In some examples, edge device 511 sends an initial message to IoT support service 551, such as a welcome packet or the like, and IoT support service 551 returns a message to edge device 511 with steps that edge device 511 is to follow before edge device 511 may begin sending data to IoT support service 551. Such steps may include, for example, updating the firmware of edge device 511, changing a configuration file, and/or the like.

In some examples, edge device 511 retains cryptographic memory of provisioning service 515 and can be redirected to provisioning service 515 during the lifetime of edge device 511 in order to re-provision edge device 511. In some examples, certain events may cause edge device 511 to initiate re-provisioning, such as edge device 511 being resold, a change in geographical regions, or the like.

In some examples, module twins in IoT support service 551 each have a corresponding module and act as virtual representations of the module to which they correspond. Modules twins may store information about the module, including properties of the module, and of the device that the module is in where relevant. A module twin may include the type of module, type of device that the module is in where relevant to the module, various properties of the module and various relevant properties of the device that the module is in, capabilities of the module, and/or the like. The exact properties stored in the module twin may depend on the type of module. For example, a temperature sensor module of a device may store the current temperature as determined by the module. A module twin associated with the function of a smart device may store the status—for example, whether a smart lock is locked or unlocked, whether a smart light is on or off, and/or the like. At least a portion of the information in the module twin may be synchronized based on the module by updating the information in the module twin based on the module. Also, information in the module twin may be queryable.

In some examples, module twins may include at least tags and properties. In some examples, the properties may include reported properties and desired properties.

In some examples, reported properties indicate the properties of the module as reported to the IoT support service. For example, for an IoT device that is a lock, the module twin associated with a module for the locking function of the smart lock may have a corresponding property indicating whether the reported status is locked or unlocked. In some examples, a desired property indicates the status that the property that the actual device should have at that time. The desired property may be the same as or different than the reported property. If the desired property is different than the corresponding reported property, actions may be taken to resolve the discrepancy.

Some devices may not always be connected, and may instead, for example, connect to the network only a few times per day, or in the case of an error. In these example, data may be buffered locally, and a specific event may trigger a connection and a data upload. Modules twins may then update when a connection occurs. Accordingly, in the case of an intermittently connecting device, a module twin may not be up-to-date until a connection occurs.

In some examples, the IoT support service can deploy modules to edge devices. The deployment may be done for a number of different reasons. For example, modules may be deployed to configure applications on edge devices based on circumstances, to add new functionality to existing edge devices, for the deployment of applications on new edge devices, and/or the like.

For example, modules may be deployed to configure applications on edge devices based on circumstances. For example, it may be determined that a considerable amount of telemetry is coming from a particular IoT device that connects to the IoT support service through a gateway. In response, the IoT support service could deploy a module to the gateway that aggregates the telemetry data. The IoT support service could also or alternately deploy an analytics module to the gateway, where the analytics module performs analytics on the telemetry data, so that the analytics can be done at the gateway rather than sending all of the telemetry data to the cloud. Accordingly, deploying modules to edge devices may be used to configure applications on edge devices on an as-needed or other basis.

Deployment of modules can also be used to add new functionality to an existing edge device. For example, artificial intelligence can be added to an existing edge device. As another example, a thermostat may have been previously adjustable by voice commands, and remotely adjustable, e.g., over a network. The IoT support service could add deploy a machine learning module to the thermostat, e.g., so that the thermostat could adjust itself based on machine learning. Similarly, IoT support service could deploy a facial recognition module to a camera that did not previously have facial recognition capabilities. If a room contained (1) a connected device capable of receiving voice commands, and (2) connected devices without native voice capability, the IoT support service could provide modules to the connected device without native voice capability and thus enable that connected devices to respond to voice commands.

Deployment of modules can also be used for new edge devices. When a new edge device is provisioned, or placed into a particular environment for the first time, the IoT support service may detect the edge device, and, in response, deploy the modules appropriate for the environment in which new edge device is placed. For example, if the motion sensors in a particular room are configured in a certain way with certain module, and a new motion sensor is placed in the room, the IoT support service can configure the new motion sensor with modules similar to the other motions sensors in the room.

In this way, edge devices need not include any code other than that for provisioning and responding to deployment instructions from the IoT support service. The edge devices need not have any code for performing their particular functions and/or have any IoT functionality, until after the code is caused to be deployed thereto by the IoT support service. In this way, a customer can buy a "vanilla" connected device that does not include code for performing the "intended" functions of the device. Instead, in some examples, the edge device will connect to cloud, and the IoT support service will deploy the modules for such functionality to the edge device.

The IoT support service may indirectly deploy the modules to the edge devices, in some examples. For instance, the IoT solution may send, to the edge device to which the modules are to be deployed, a command to download the modules from a module repository. In other examples, the IoT support service may directly send the modules to the edge device. For example, module repository 519 may be omitted from some systems. In other examples, the IoT support service may send, to the edge device to which the modules are to be deployed, a command to download the modules from a module repository, such as module repository 519 of FIG. 5.

When deploying modules, in some examples, the IoT support service determines one or more modules to be deployed and identifies edge device to which to deploy the determined modules. The IoT support service may then cause the determined modules to be deployed to the identified edge device. The IoT support service may also update the module twins based on the deployed modules, so that each of the deployed modules has a corresponding module twin stored in the IoT support service.

In some examples, the deployment of modules to the edge devices is driven by the cloud. In some examples, the IoT support service itself drives the deployment of the modules to the edge devices. In some examples, deployment of the modules may be based on rules in the IoT support service, and in other examples, the set of modules required in particular edge devices may be determined by an IoT solution operator and communicated to the IoT support service. The IoT support service could then deploy the modules accordingly. In other examples, a back-end application in the application back-end may drive deployment of modules to the edge devices.

Cloud deployment of modules to edge devices may have many benefits, including re-use of code. Some functionality may be re-used across many different solution and types of devices. For example, the same artificial intelligence module may be re-usable across many types of solutions and/or across many types of edge devices. Similarly, the same analytics module may be reusable across many types of solutions and/or across many types of edge devices. In these examples, the same module with the same code can be deployed to many different edge devices, which may include different types of edge devices, without requiring modification of the code in the modules deployed or in the other modules already present in the edge devices to which the modules are deployed.

In some examples, cloud-initiated modifications of applications in edge devices may be performed by the IoT support service. In some examples, the modifications of applications in edge devices can be made in one or more modules of the edge device, without requiring re-deployment of the entire application. Modifications may include updates, configurations, and/or the like.

In this way, configurations can be changed independently. For example, if changing the analytics portion of an application on an edge device is required, the IoT support service can cause the module that controls the analytics to be updated, so that a specific configuration on the analytics module can be changed without having to re-deploy the entire edge application.

In some examples, for certain functionality such as artificial intelligence (AI) or facial recognition, training may be done in the cloud, while the model obtained from the training may be deployed to the edge device. In some examples, if the model is updated, the IoT support service can cause the model in the AI to be changed, while modifying only the AI model and not requiring the entire application to be re-deployed.

In some examples, the IoT support service may receive a declarative request or the like from the application back-end. In some examples, the declarative request can be decomposed into individual configurations that are sent to edge devices. In some examples, the individual configurations are executed by the edge device, and have the effect of configuring how the edge device sends telemetry data. In some examples, the individual configuration are not limited to just telemetry data, and instead the code of one or more modules in the edge device can be modified in any suitable manner.

After the IoT device decomposes the declarative request into individual configurations, the destination edge devices associated with the configuration may be identified. For example, a declarative request may be a request to provide an alert when a particular face is identified in a particular building. The request may be broken down into individual configurations that will modify particular facial recognition modules in particular edge devices.

In some examples, the particular edge device(s) for which the module will be modified are identified. Next, the configurations may be communicated to the identified edge device(s). In response to receiving the configurations, the identified edge device may proceed to update the relevant module(s) based on the received configurations.

As discussed above with regard to module deployments, the IoT support service may indirectly deploy updates to the modules to the edge devices, in some examples, and in other examples, the IoT support service may send, to the edge device to which the modules are to be updated, a command to download the new code for the module from a module repository, such as module repository 519 of FIG. 5.

In some examples, some processing, intelligence, and/or computation occurring in the IoT support service may be offloaded to edge devices by changing one or more services in the IoT support service into one or more modules which may then be deployed to edge devices.

While it may be advantageous to have some functionality in the cloud, it may also be advantageous to have some functionality in the edge. Processing in the edge may be advantageous for low-latency tight control loops that require or benefit from real-time/near real-time response. Processing on the edge can be advantageous for reasons of privacy and confidentiality of data, and for protecting against the inherent unpredictability of the public internet. IoT services can still be managed from the cloud while offloading particular processing to the edge where it is advantageous to do so. The ability to move functionality from the cloud to the edge may also enable increased flexibility.

In some examples, an entire cloud service (e.g., one of services 571-573) may be converted into a module (e.g., one of modules 531-533) to be deployed to edge devices (e.g., edge device 511), and the cloud service may cease execution once the modules are operating on the edge devices. In some examples, a portion of a cloud service may be transformed into a new module, or be added as new code to an existing module, which may be used to modify existing modules in edge devices as discussed above with regard to cloud-initiated modifications of modules in edge devices. In these examples, the remaining portion of the cloud service may still execute.

When it is determined which edge devices are to have which modules, including modules that may have previously been cloud services, a hierarchy of edge devices may be used. For example, the hierarchy may be based on location, or particular categories of devices within hierarchical locations. For example, the location of an IoT device may be defined by city, building, floor, and room.

In this example, "city" is the top level of the location hierarchy. In this example, underneath "city" in the location hierarchy is building. In this example, every IoT device in a particular building is also in the city in which the building resides. Similarly, in this example, every IoT device on a particular floor belongs to the building in which the floor resides and in the city in which the building resides. Similarly, in this example, every IoT device in a particular room belongs to the floor in which the room resides, and so forth. In this way, in this example, the location metadata is hierarchical. In this example, when the room in which the IoT device resides is assigned, then based on how the hierarchical category is defined, the floor, building, and city are also defined.

In this way, for example, all of the temperature sensors in a particular building may have a particular module. A particular cloud service could be offloaded to the edge by making the cloud service a module to be deployed on the edge, and this module could be deployed, for example, on all temperature sensor in a particular building. At the time of offloading, the module can be deployed to each temperature sensor in the building. The deployment may be a long-standing deployment in some examples, so that, when a new temperature sensor is placed in this building, the module can automatically be deployed to the temperature sensor.

Hierarchies may also be based on categories other than location, such as functionality and/or device type. For example, all devices that collect data could be one level of a hierarchy, for which certain modules could be deployed to all such devices, and this hierarchy could be subdivided further based on particular hierarchical categories of data being gathered. A device that gathers a particular type of data may have a particular type of module deployed to the device in some examples.

For instance, in some examples, AI training may be done in the cloud, and the model may be changed from service to a module that is deployed to the edge. The module could be deployed to all relevant edge devices in building 54.

In this way, edge devices for which module(s) are to be deployed may be determined based on at the determined position of the edge devices on the hierarchy. For instance, as discussed above, a particular module may be deployed to all temperature sensors in building 53. As also discussed above, in some examples, such a deployment may be longstanding, so that, for example, if a temperature sensor lacking the particular module is activated in building 53, the particular module may be automatically deployed to the temperature sensor.

Offloading certain functionality from the cloud to the edge may be useful in, for example, the optimization of production lines in a manufacturing plant. In some examples, production lines are composed of multiple machines, each containing many sensors, producing thousands of data points per second. These sensors may emit a large amount of telemetry data such as temperature, humidity, motor speed, etc., but may also produce complex data such as machine diagnostics maps, machine state, audio or video data. Further, in some examples, these data points are analyzed to extract information about individual machine health, but also aggregated at the production line level to report and optimize production yields. In some examples, requirements of low latency, conservation of network bandwidth and preservation of privacy makes it advantageous to perform computing and processing as close to the sensors as possible, and at the same time aggregation at the production line level for aggregate analysis and control.

Offloading certain functionality from the cloud to the edge may also be useful in smart buildings. Sensor technology may be used to conserve energy, performing simple tasks such as automatically turning the lights on and off when someone enters or leaves a room. Passive infrared sensors (PIRs), simple photocells, and CO2 sensors may enable these tasks. Field Gateways may be used in buildings to allow communication of building automation and control systems for applications such as heating, ventilating, and air-conditioning control (HVAC), lighting control, access control, and fire detection systems and their associated equipment.

Building automation technology typically mostly relies on conventional rule-based systems in which human programmers do the 'heavy lifting' of rule creation and modification. These systems, often deployed in on premise server solutions, may become fragile as they evolve and multiple layers of rule patches form to account for a myriad of new rule exceptions. In contrast, in some examples, smart building solutions may enable the capability to source and analyze richer levels of data, enabling the execution of more sophisticated tasks that go far beyond energy consumption management. In some examples, a smart building knows how space is used at every single moment, how many people are in each room, how long the lunch line is in the café, where is a free desk, how to adjust the environment to the personalized comfort preferences of an individual, and/or the like. This awareness may translate into a more cost-effective and comfortable working environment for the building occupants.

In some examples, a decentralized architecture of building automation may be used where analytics can run local on edge devices, instead of in the cloud or on a central server. Energy-efficient embedded processors may afford the ability to process analytics inside the sensor unit itself, or run advanced analytics within local field gateways. In some examples, with this approach, the data sent over the network can be merely the final summary of the analysis, which is thinner in volume, and allows shorter response time.

By lifting the burden of defining effective rules from the human experts and transferring them to the algorithm, data-driven Machine Learning systems may be excellent tools for rich data analysis, particularly when employing more advanced sensor solutions or cameras at the sensing layer. Deep Learning may be used in many Machine Learning domains, especially Vision, Speech, and Natural Language Processing and Understanding, as well as sensor fusion scenarios involved in making buildings smart. With Deep Learning, the algorithm may define an end-to-end computation—from the raw sensor data all the way to the final output. In some examples, in this model, the algorithm itself determines what the correct features are and how to compute them. This may result in a much deeper, more complex level of computation. In some examples, such algorithms execute on edge devices to ensure real-time results in some of the scenarios outlined above.

Although particular examples of applications of offloading particular processing from the cloud to the edge are discussed above, the disclosure is not limited to the particular example applications discussed above. Offloading particular processing from the cloud to the edge may also be useful in other suitable applications, such as connected vehicles as one examples. For instance, offloading particular processing from the cloud to the edge may be used for fleet or transportation logistics managements using a gateway module in the vehicle for coordination and data aggregation of additional devices, and/or for Advanced Driving Assisted Systems (ADAS).

As an example of offloading a cloud service as a module to edge devices, a use case is given here where sensor data (example temperature data) is aggregated in a stream analytics module (a custom logic module works as well).

Then, in this example, if the average in the last 10 minutes is above a threshold:

A Function is invoked (which calls a direct method on the device to shut it down); and A message is sent to a Service Bus Q, which is then processed by Logic apps to create a ticket.

In this example, in this flow:

Devices send d2c messages using an IoT software development kit (SDK) with a property type='temp'

IoT Hub routes: type='temp' →stream analytics job 1 stream analytics job 1:
    Performs query:
    SELECT DeviceId, AVG(temp) AS [Avg]
    INTO shutdownFunction, alertQueue
    FROM input TIMESTAMP BY Time
    GROUP BY DeviceId, TumblingWindow(minute, 10)
    HAVING [Avg]>100
    Outputs:
        shutdownFunction is configured to go to a Function shutdown( )
        alertQueue is configured to go to a service bus (SB) queue alertQueue In this example, the volume of data that is flowing to the cloud is too large such that the solution owner wants to move parts of this flow in the edge devices, specifically: the stream analytics job and the shutdown function.

In this example, in the migrated flow:

The sensor module may look exactly like the device app in the previous flow, sending d2c messages with: type='temp'

The stream analytics module is configured with a job executing the same query. The only different behavior is that stream analytics uses the runtime routing to route to an output endpoint instead of its own. A possible way to do this is by adding a special property called ASA—output (stream analytics already required named outputs in the cloud).

The function simply awaits incoming messages (with the same stream analytics format as in the previous flow) and calls a direct method on the local device using the local IoT Hub SDK without code changes.

The edge runtime is configured to route:
    type='temp' →stream analytics job 1
    ASA—analytics—
        output='shutdownFunction'→Function shutdown( )
    ASA—output='alertQueue'→cloud
        IoT Hub routes:
        ASA—output='alertQueue'→SB queue alertQueue In this example, there is virtually no code changes. In this example:

|  | Initial flow | Migrated flow | Delta |
| --- | --- | --- | --- |
| Sensor data | Send D2C message with type = 'temp' | Send D2C message with type = 'temp' | Identical |
| Route to stream analytics | IoT Hub route: type = 'temp'→ stream analytics job 1 | Runtime route: type = 'temp'→ stream analytics job 1 | Superficial difference |
| stream analytics query | SELECT DeviceId, AVG(temp) AS [Avg] INTO shutdownFunction, alertQueue FROM input TIMESTAMP BY Time GROUP BY DeviceId, TumblingWindow(minute, 10) HAVING [Avg] > 100 | SELECT DeviceId, AVG(temp) AS [Avg] INTO shutdownFunction, alertQueue FROM input TIMESTAMP BY Time GROUP BY DeviceId, TumblingWindow(minute, 10) HAVING [Avg] > 100 | Identical |
| stream analytics | stream analytics configured to: | Runtime configured to: ASA_output = | Superficial difference |

-continued

|  | Initial flow | Migrated flow | Delta |
|---|---|---|---|
| output | shutdownFunction → Function shutdown( ) alertQueue → SB queue alertQueue | 'shutdownFunction' → Function shutdown( ) ASA_output = 'alertQueue' → cloud IoT Hub configured to: ASA_output = 'alertQueue' → SB queue |  |

Cloud-initiated modification of modules is discussed above. The modification of modules in edge devices may include the deployment of declarative rules to edge devices. The declarative rules may include rules that trigger based on events. Such a declarative rule may determine, based on the rule, whether a particular event has occurred. For example, an event might trigger based on the temperature in a particular room reaching a particular level. When the event triggers, the declarative rule may cause the module that includes the declarative rule to communicate to one or more declarative targets the fact that the event triggered. The declarative targets may include the IoT support service, but may also include one or more other edge devices, or another module in the same edge device.

The particular declarative targets may depend on the exact nature of the declarative rule and the event. For example, an event may trigger in response to a fire being detected, and the rule may cause particular people and/or devices to be notified up on the detection of fire in a particular location.

In one example, a configuration may be pushed to a generator, where the configuration includes a declarative rule. The declarative rule may specify that an alarm generated by a generator causes, via a declarative rule in a module of the edge device, notification of the alarm to be sent from the module to a logic application service in the cloud.

In various examples, new declarative rules that trigger based on events may be newly generated and deployed in the edge, and/or existing declarative rules that trigger based on events may already be executed in a cloud service in the IoT support service and be changed to a configuration of a module and deployed to the edge.

In some examples, for an edge device may only connect to the network a few times a day, or in the case of a specific error, and the data is buffered locally. In some of these examples, a declarative rule may cause, in response to triggering based on the event being detected, a connection to the network and a data upload.

In some examples, the declarative rules that includes triggers based on events may be implemented based on event Application Program Interfaces (APIs) that support a declarative configuration of event routing.

In some examples, declarative routing based on events may occur in the edge while being managed by the IoT support service, so that seamless event handling is centrally coordinated by the IoT support service even though the detection of events and routing and notification of detected events is performed by various edge device.

As discussed above, in some examples, virtual IoT device 513 acts as if it were connected device 512, and modules 524-526 executing on virtual IoT device 513 appear to be modules executing on connected device 512. The various controls and actions discussed above that IoT support service 551 may perform with regard to modules 521-523, may also be performed with modules 524-526. In some examples, from the perspective of IoT support service 551, it appears as though the modules 524-526 are executing on connected device 512; from the perspective of IoT support service 551, there is no difference. In some examples, anything that IoT support service can do with modules running on an edge device with 511, IoT support service 551 can do with modules 524-526 even though modules 524-526 are actually running on a virtual IoT device, and there is no difference from the perspective of IoT support service 551.

Accordingly, IoT support service 551 can deploy new modules to virtual IoT device 513 (which appear to be deployed on connected device 512), can alter modules on virtual IoT device 513, can offload cloud functionality to virtual IoT device 513, can modify the virtual IoT device with a declarative rule that triggers based on an event, and/or the like. Also, in some examples, the modules twins 534-536 are twins of modules 524-526, and operate in the same manner as modules twins 531-533 of modules 521-523, even though modules 521-523 are executing on an actual IoT device and modules 524-526 are executing on a virtual IoT device, and modules twins 524-526 may be acted in response to upon in the same manner as modules twins 521-523. For instance, in some examples, queries made be made on modules twins 524-526 in the same manner as any other module twins. Even if connected device 512 is not, by itself, an IoT device, by means of intermediary device 543, connected device 512 effectively becomes an IoT device.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 6:
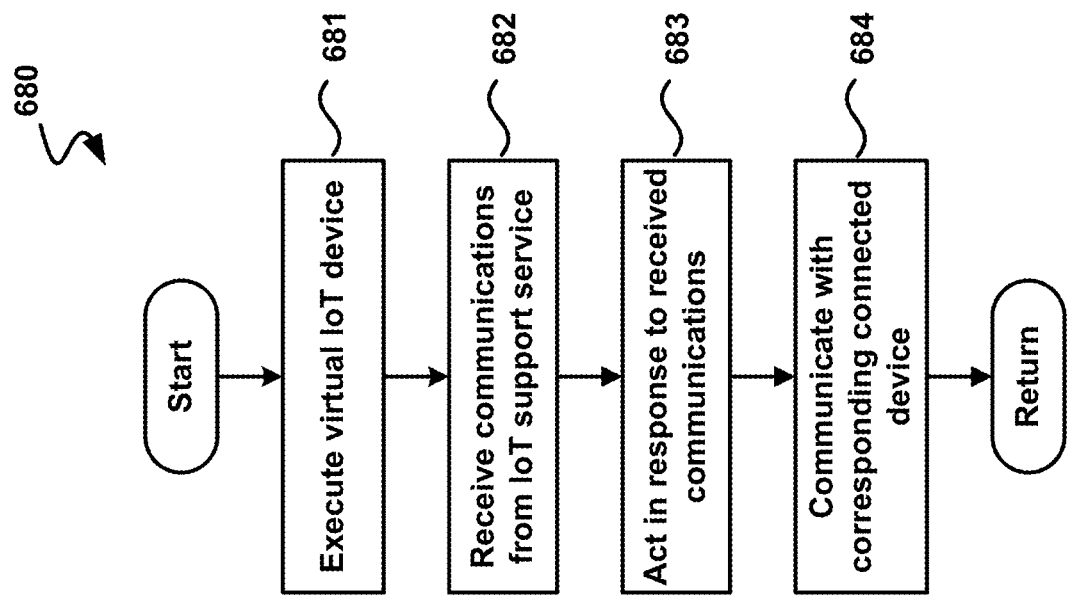
FIG. 6 is a flow diagram illustrating an example process for IoT technology which may be performed, e.g., by an intermediary device.

FIG. 6 is a flow diagram illustrating an example process (680) for IoT technology, that may be performed, e.g., by an intermediary device, such as intermediary device 443 of FIG. 4 and/or intermediary device 543 of FIG. 5.

In the illustrated example, step 681 occurs first. At step 681, in some examples, a virtual IoT device is executed. In some examples, the virtual IoT device maintained and controlled to act as a representation of a connected device. As shown, step 682 occurs next in some examples. At step 682, in some examples, communications are received from an IoT support service.

As shown, step 683 occurs next in some examples. At step 683, in some examples, the received communications from the IoT support service are acted in response to, including sending communications to the IoT support service in response to the received communications, and changing the virtual IoT device as if the virtual IoT device were the connected device. As shown, step 684 occurs next in some examples. At step 684, in some examples, the connected device is communicated with based on changes in the virtual IoT device. The process may then proceed to a return block, where other processing is resumed.

Figure 7:
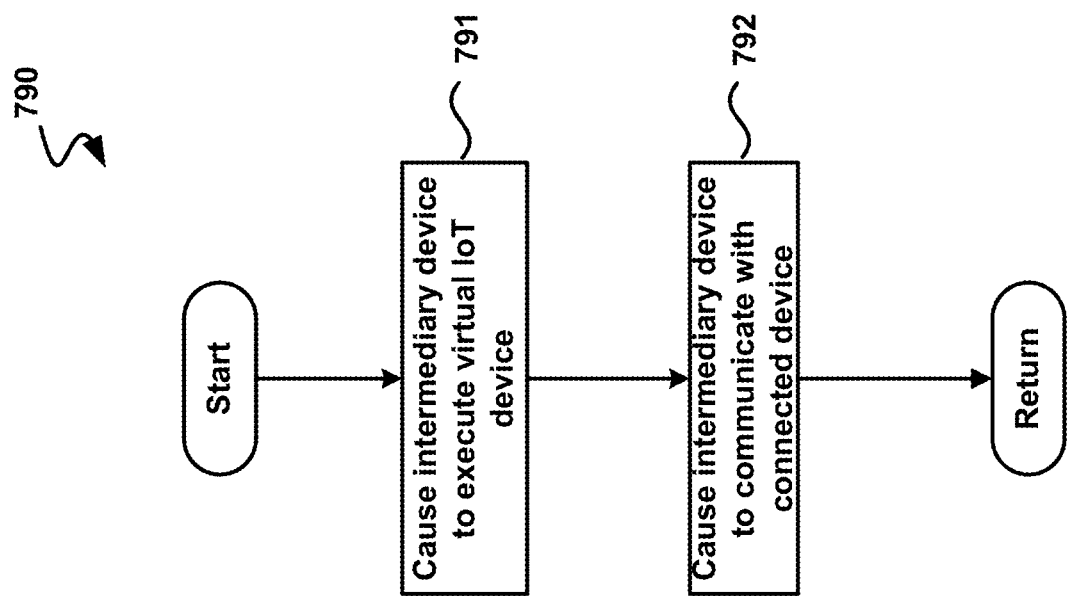
FIG. 7 is a flow diagram illustrating an example process for IoT technology which may be performed, e.g., by an IoT support service, in accordance with aspects of the present disclosure.

FIG. 7 is a flow diagram illustrating an example process (790) for IoT technology, that may be performed, e.g., by an IoT support service, such as the IoT support service of FIG. 3, FIG. 4, and/or FIG. 5.

In the illustrated example, step 791 occurs first. At step 791, in some examples, an intermediary edge device is caused to execute a virtual IoT device such that the virtual IoT device acts as if the virtual IoT device were a corresponding connected device. As shown, step 792 occurs next in some examples. At step 792, in some examples, the intermediary edge device is caused to communicate with the corresponding connected device based on changes in the virtual IoT device. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   an intermediary edge device, including at least one memory adapted to store run-time data for the device, and at least one processor that is adapted to execute processor-executable code that, in response to execution, enables the intermediary edge device to perform actions, including:
   maintaining and controlling a virtual Internet of Things (IoT) device to act as a representation of a connected device;
   storing, on the virtual IoT device, a plurality of edge applications, wherein each edge application of the plurality of edge applications is comprised of at least two modules of a plurality of modules, wherein modules of the plurality of modules are interoperably compositable with other modules of the plurality of modules without altering the other modules of the plurality of modules;
   receiving communications from an IoT support service;
   synchronizing the modules of the plurality with corresponding module twins on the IoT support service, wherein each module twin corresponds to a module of the plurality and includes metadata associated with the corresponding module, and wherein the synchronizing includes synchronizing at least a portion of the metadata on the module twins based on the corresponding modules;
   via the plurality of edge applications, acting in response to the received communications from the IoT support service, including sending communications to the IoT support service in response to the received communications, and, via the plurality of edge applications, changing the virtual IoT device as if the virtual IoT device were the connected device; and
   communicating with the connected device based on changes in the virtual IoT device.

2. The apparatus of claim 1, where communications between the intermediary device and the connected device are accomplished via a serial communications protocol.

3. The apparatus of claim 1, the actions further including: enabling communications between the modules of the plurality of modules, and between the modules of the plurality of modules and the IoT support service such that each module of the plurality is configured to communicate with the IoT support service using a common security context.

4. The apparatus of claim 1, the actions further including: based on instructions from the IoT support service, storing an additional module as part of the edge application of the virtual IoT device without altering the modules of the plurality.

5. The apparatus of claim 1, the actions further including: based on instructions from the IoT support service, removing a module of the plurality from the edge application of the virtual IoT device without altering the other modules of the plurality.

6. The apparatus of claim 1, the actions further including: based on instructions from the IoT support service, modifying at least one module of the plurality of modules of the virtual IoT device.

7. The apparatus of claim 1, the actions further including: based on instructions from the IoT support service, modifying at least one module of the plurality of modules of the virtual IoT device to add a declarative rule; detecting a triggering of the declarative rule based on a particular event having been determined to have occurred; and in response to the declarative rule being triggered, communicating the triggering of the event to at least one declarative target.

8. A method, comprising:
   employing at least one processor to execute a virtual Internet of Things (IoT) device such that the virtual IoT device acts as if the virtual IoT device were a corresponding connected device;
   storing, on the virtual IoT device, a plurality of edge applications, wherein each edge application of the plurality of edge application is comprised of at least two modules of a plurality of modules, wherein modules of the plurality of modules are interoperably compositable with other modules of the plurality of modules without altering the other modules of the plurality of modules;

synchronizing the modules of the plurality with corresponding module twins on an IoT support service, wherein each module twin corresponds to a module of the plurality and includes metadata associated with the corresponding module, and wherein the synchronizing includes synchronizing at least a portion of the metadata on the module twins based on the corresponding modules;

and via the plurality of edge applications, communicating with the corresponding connected device based on changes in the virtual IoT device.

9. The method of claim 8, where communications between the intermediary device and the connected device are accomplished via a serial communications protocol.

10. An apparatus, comprising:
an Internet of Things (IoT) support service, including at least one memory adapted to store run-time data, and at least one processor that is adapted to execute processor-executable code that, in response to execution, enables the IoT support service to perform actions, the actions including:
causing an intermediary edge device to execute a virtual IoT device such that the virtual IoT device acts as if the virtual IoT device were a corresponding connected device;
causing to be stored, on the virtual IoT device, a plurality of edge applications, wherein each edge application of the plurality of edge application is comprised of at least two modules of a plurality of modules, wherein modules of the plurality of modules are interoperably compositable with other modules of the plurality of modules without altering the other modules of the plurality of modules;
storing a plurality of module twins that respectively correspond to the modules of the plurality of modules of the edge application on the virtual IoT device, wherein the plurality of module twins individually include metadata associated with the corresponding module of the plurality of modules;
synchronizing the metadata of each module twin of the plurality of module twins based on the corresponding module, and via the plurality of edge applications, causing the intermediary edge device to communicate with the corresponding connected device based on changes in the virtual IoT device.

11. The apparatus of claim 10, the actions further including: enabling communications between the modules of the plurality of modules and the IoT support service according to a common security context.

12. The apparatus of claim 10, the actions further including: determining at least one further module to be deployed on the virtual IoT device; deploying the determined at least one further module to the virtual IoT device; and in response to deploying the determined at least one further module, updating the plurality of module twins by adding, to the plurality of modules twins, modules twins corresponding to the deployed modules.

13. The apparatus of claim 10, the actions further including: determining at least one module of the plurality of modules on the virtual IoT device to be modified; and causing the determined at least one module of the plurality of modules to be modified.

14. The apparatus of claim 10, the actions further including: executing a plurality of services, such that the services of the plurality of services are configured to communicate with the modules of the plurality of modules; determining at least one service of the plurality of services for which at least a portion of the service is to be executed as a further module on at least one edge device of the plurality of edge devices; and causing the further module to be deployed to the at least one edge device of the plurality of edge devices.

15. The apparatus of claim 10, the actions further including: determining at least one module of the plurality of modules to be modified by adding a declarative rule, such that the declarative rule causes, in response to the declarative rule being triggered based on a particular event having been determined to have occurred, communicating the triggering of the event to at least one declarative target; and causing the determined at least one module of the plurality of modules to be modified by adding the declarative rule.

* * * * *